Feb. 18, 1969  W. L. GUILES  3,428,093
FLEXIBLE CONDUIT
Filed Dec. 23, 1966

INVENTOR
WESLEY L. GUILES

BY Pennie, Edmonds, Morton,
Taylor and Adams
ATTORNEYS

United States Patent Office 3,428,093
Patented Feb. 18, 1969

3,428,093
FLEXIBLE CONDUIT
Wesley L. Guiles, Guilford, Conn., assignor, by mesne assignments, to Automation Industries, Inc., El Segundo, Calif., a corporation of California
Filed Dec. 23, 1966, Ser. No. 604,228
U.S. Cl. 138—132
Int. Cl. F16l 11/16, 9/16, 57/00
8 Claims

ABSTRACT OF THE DISCLOSURE

A helically fabricated wire reinforced flexible conduit having a cover and an abrasion-resistant helically wound liner strip wherein the liner strip is secured to the cover at its first marginal edge and the second marginal edge loosely overlaps the joint between the first marginal edge of the succeeding convolution and the cover.

---

This invention relates to flexible conduits having a wire helix, a cover strip helically wrapped about the helix and a liner strip helically wrapped radially inwardly of the helix. More particularly, this invention relates to a novel liner construction in conduits of the above type wherein a first marginal edge of each liner ply strip convolution is joined to the cover ply while a second marginal edge remains unsecured and moves freely as the conduit is flexed, providing a conduit of sufficient strength to handle abrasive materials while retaining adequate flexibility.

It is desirable in materials handling operations to employ flexible reinforced plastic conduits because of their low cost, ease of installation and durability. However, the use of such conduits have been limited in the handling of abrasive materials because of the deleterious effect of abrasion on conduit life. It is not enough simply to increase the gauge of the plastics used because the increase in mass is accompanied by a decrease in flexibility. Furthermore, no suitable material which is sufficiently durable and flexible in heavy gauge is available at present. The improved flexible conduit of the present invention has been successful in solving the problem of combining durability and flexibility in a flexible conduit for handling abrasive materials primarily because of its novel liner construction.

The flexible conduit of the present invention comprises a wire helix and a cover strip surrounding the helix. It is particularly characterized by an abrasion-resistant liner strip helically wrapped radially inwardly of the helix. The liner strip has a first marginal edge joined to the cover ply and a second marginal edge loosely overlapping the joint between the first marginal edge of the succeeding convolution and the cover strip.

As noted above, the flexible conduit of the present invention is particularly suitable for handling abrasive materials. Earlier conduits of this type either failed after a short period because of wear resulting from abrasion or were so massive as to be too inflexible. However, the present conduit provides both durability and flexibility. Durability results from the two-ply construction, a cover and a liner, which gives the conduit adequate mass to resist abrasion for prolonged periods. Flexibility results from the novel liner construction wherein the first marginal edge of the liner strip is joined to the cover ply and the second marginal edge loosely overlaps the joint between the first marginal edge of the succeeding convolution and the cover strip. Because of this construction, the liner strip convolutions telescope during flexure allowing the conduit to retain almost as much flexibility as it would have even in absence of a liner strip. This unique liner construction yields yet another advantage in that the loosely overlapping second edge protects from abrasion the joint between the first edge and the cover strip thereby further increasing conduit life.

A preferred embodiment of the invention is described hereinbelow with reference to the drawings wherein.

Figure 1:
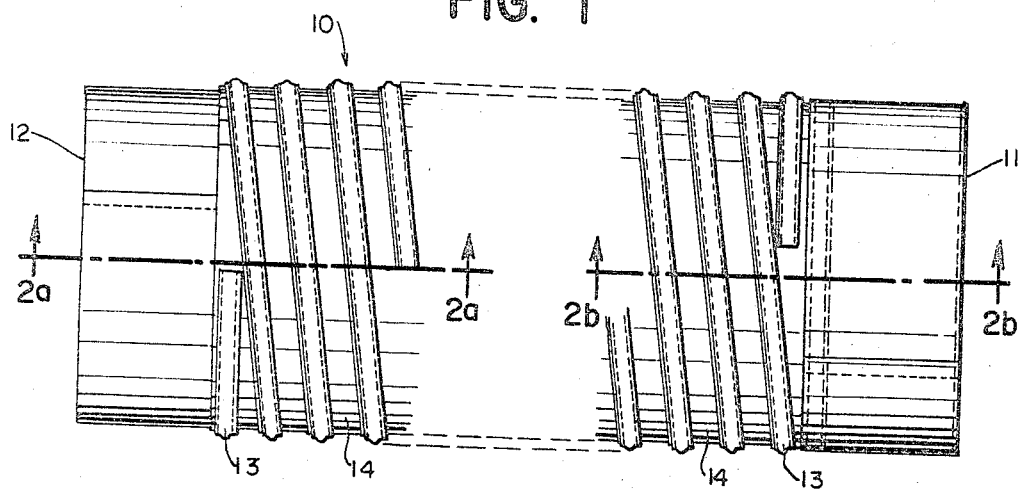
FIG. 1 is a plan view of the present conduit showing particularly the inlet and outlet portions thereof.
Figure 2A:
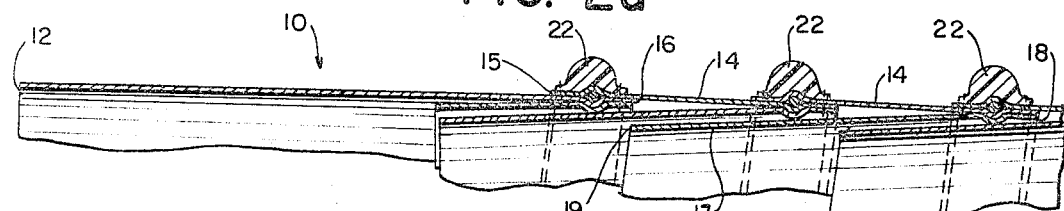
FIG. 2a is a sectional view taken substantially along line 2a of FIG. 1.
Figure 2B:
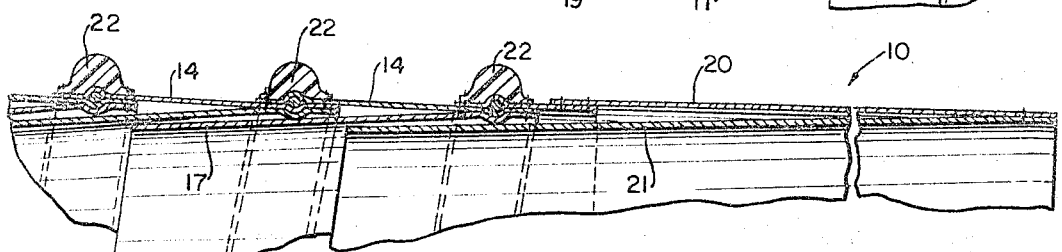
FIG. 2b is a sectional view taken substantially along line 2b of FIG. 1.

Referring initially to FIG. 1, the present conduit 10 is of generally circular cross section and has an inlet end 11 and an outlet end 12. The conduit 10 comprises a helix 13 which may be constructed of metal, plastic or other suitable self-supporting filament. A cover strip is made from an elongated fabric strip 14 and is wrapped under tension about the helix 13. Preferably, the strip 14 should have the same pitch as the helix 13 but be of greater width than its pitch allowing adjacent convolutions to overlap one another.

In the embodiment illustrated herein, the helix 13 is secured between the overlapping portions 15, 16 of the convolutions of the cover strip 14, portion 15 being radially inwardly of the helix 13 and portion 16 being radially outwardly thereof. The convolutions of the cover strip 14 are bonded together at portions 15 and 16 by stitching, adhesive or other suitable means.

A liner strip 17 may be made from an abrasion-resistant material including thermoplastic and thermosetting plastics which lend themselves either to stitching or assembly with adhesives. The liner strip 17 may be of a relatively hard material such as superpolyamine, polytetrafluoroethylene, polyethylene or polyethylene terephthalate or it may be of a relatively soft material such as natural rubber, urethane rubber or any of the synthetic polymers. The particular selection is dependent upon the nature of the material to be transmitted through the conduit 10.

The liner strip 17 has a first marginal edge 18 and a second marginal edge 19. It is wrapped radially inwardly of the helix 13 preferably with a pitch substantially equal to that of the helix 13. The liner strip 17 is secured by stitching or adhesive at its first marginal edge 18 only to the cover strip 14. The second marginal edge 19 of each convolution of the liner strip 17 loosely overlaps the joint between the first marginal edge 18 of the succeeding convolution and the cover strip 14. In order that this may be accomplished, the width of the liner strip 17 must be at least as great as its pitch and preferably at least one and one half times greater. The consequences of this liner construction are twofold. First, because the liner strip 17 is secured at its leading marginal edge 18 only to the cover strip 14, the liner strip 17 will not buckle when the conduit 10 is flexed but its convolutions will telescope with respect to one another. As a result, the resistance to flexure of the liner material is substantially eliminated and the conduit 10 will flex with substantially the same ease as a comparable unlined conduit. Second, because the second marginal edges 19 of each convolution overlap the joint between the first marginal edges 18 of the succeeding convolutions the joint is effectively protected from attack by the abrasive matter transmitted through the conduit 10 thereby greatly increasing conduit life. It is particularly important that the liner strip 17 be wound so that the first marginal edge 18 of a given convolution is closer to the inlet end 11 of the conduit 10 than is the second marginal edge 19 of that same convolution. This orientation will ensure that none of the matter flowing through the conduit 10 becomes entrapped in the open spaces between adjacent convolutions of the liner strip 17.

An inlet cuff 20 of conduit 10 is provided with an inner sleeve 21 which overlaps the joint between the first convolution of the liner strip 17 and the cover strip 14, enabling the joint to be protected along its entire length.

A scuff strip 22 may be applied to the outer surface of the conduit 10 directly over the helix 13. The scuff strip 22 protects the outside of the conduit 10 from abrasion. In lieu of the scuff strip 22, the entire conduit 10 may be encased in a sleeve of flexible abrasion-resistant material (not shown).

I claim:

1. In a flexible conduit having a wire helix and a helically wrapped cover strip surrounding the helix, each convolution of the cover strip overlapping adjacent convolutions thereof, the improvement in combination therewith comprising an abrasion-resistant liner strip helically wrapped radially inwardly of the helix, the liner strip having a first marginal edge joined to the cover strip and a second marginal edge loosely overlapping the joint between the first marginal edge of the succeeding convolution and the cover strip.

2. A flexible conduit according to claim 1 wherein adjacent convolutions of the liner strip telescope with respect to one another when the conduit is flexed.

3. A flexible conduit according to claim 1 wherein the liner strip is wrapped with substantially the same pitch and direction as that of the helix.

4. A flexible conduit according to claim 3 wherein the overlapping adjacent convolutions of the cover strip are joined about the helix and the joint between the first marginal edge of the liner strip and the cover strip coincides therewith.

5. A flexible conduit according to claim 3 wherein the width of the liner strip is greater than its pitch.

6. A flexible conduit according to claim 3 wherein the width of the liner strip is at least one and one half times greater than its pitch.

7. A flexible conduit according to claim 1 wherein the liner strip is made from either superpolyamide, polytetrafluoroethylene, polyethylene, polyethylene terephthalate, natural rubber or urethane rubber.

8. A flexible conduit according to claim 1 further comprising an inlet cuff having an inner sleeve fastened to the cuff which loosely overlaps the joint between a first convolution of the liner strip and the cover strip.

References Cited
UNITED STATES PATENTS

| | | | |
|---|---|---|---|
| 1,145,434 | 7/1915 | Pechstein | 138—131 |
| 1,580,760 | 4/1926 | Palmer | 138—135 X |
| 2,895,509 | 7/1959 | Ticknor | 138—133 |
| 3,037,798 | 6/1962 | Cooper | 138—122 X |

HERBERT E. ROSS, *Primary Examiner.*

U.S. Cl. X.R.

138—129, 154